US010810562B1

(12) United States Patent
McKinnon et al.

(10) Patent No.: US 10,810,562 B1
(45) Date of Patent: Oct. 20, 2020

(54) TRANSFER OF A TRANSACTION FROM A WOUNDED ATM TO ANOTHER ATM

(71) Applicant: Capital One Services, LLC, McLean, VA (US)

(72) Inventors: Nathaniel McKinnon, Henrico, VA (US); Ehab M. Awadallah, Annandale, VA (US); Jeremy J. Phillips, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/739,705

(22) Filed: Jan. 10, 2020

(51) Int. Cl.
*G06Q 20/10* (2012.01)
*G07F 19/00* (2006.01)

(52) U.S. Cl.
CPC ....... *G06Q 20/1085* (2013.01); *G07F 19/203* (2013.01); *G07F 19/209* (2013.01)

(58) Field of Classification Search
CPC .. G06Q 20/1085; G07F 19/203; G07F 19/209
See application file for complete search history.

(56) References Cited

U.S. PATENT DOCUMENTS

| 8,590,787 | B1 | 11/2013 | Courtright |
| 10,009,773 | B2 | 6/2018 | Smith et al. |
| 10,165,056 | B2 | 12/2018 | Mande et al. |
| 2014/0052554 | A1* | 2/2014 | Abraham ................. G07G 1/14 705/21 |
| 2014/0324610 | A1 | 10/2014 | Ans et al. |
| 2015/0136847 | A1* | 5/2015 | Mishra .................... G06Q 40/02 235/379 |
| 2016/0098904 | A1* | 4/2016 | Choudhury ........... G07F 19/203 705/43 |
| 2016/0180310 | A1* | 6/2016 | Taylor ................ G06Q 20/1085 705/21 |
| 2020/0034809 | A1* | 1/2020 | Acedera ............... G06Q 20/202 |

\* cited by examiner

*Primary Examiner* — Laura A Gudorf
(74) *Attorney, Agent, or Firm* — Sterne, Kessler, Goldstein & Fox P.L.L.C (57) ABSTRACT

Disclosed herein are system, method, and computer program product embodiments for completing the transaction at another ATM upon determining that an ATM where a transaction being performed is unable to complete the transaction. Upon detection of an error condition at the ATM, a current status of the transaction being performed at the ATM and the error condition may be analyzed to determine an option to complete the transaction. Upon determination that the transaction can be completed at the other ATM, a notification may be sent to the customer. In response to the notification, information identifying the transaction may be received from the other ATM, and a session identifying the transaction may be sent to the other ATM, thereby allowing the transaction to complete at the other ATM.

17 Claims, 5 Drawing Sheets

TRANSFER OF A TRANSACTION FROM A WOUNDED ATM TO ANOTHER ATM

BACKGROUND

A financial transaction with a bank may be completed during normal bank operation hours by interacting with a bank teller. A bank customer may be required to provide his or her authentication information to authenticate as a genuine owner of a bank account. After authentication by the bank teller based on identification such as photo identification and security questions, the bank teller may perform the financial transaction.

Many financial transactions are performed at an automated teller machine (ATM). Example transactions performed at an ATM include withdrawing cash from, or depositing cash to, a bank account of the customer. To perform a transaction at an ATM, a customer may use a bank-issued credit or debit card. The bank customer may be required to swipe or insert his or her bank-issued credit or debit card at the ATM and provide a personal identification number (PIN) for authentication. Once it is verified that the PIN the bank customer has entered is associated with the credit or debit card, the bank customer is successfully authenticated, and access to the bank account may be provided to the bank customer. The bank customer may request, for example, cash withdrawal from one of the account that may be accessed by the credit or debit card.

Upon the bank customer's request to withdraw money from the account, the transaction may be verified against the policy to authorize or deny the requested transaction. The transaction may be verified to confirm that the transaction does not exceed the daily withdrawal limit and/or a total number of transactions allowed per day. The transaction may be approved if the transaction does not cause the account balance to go into negative. The transaction may be approved if the transaction satisfies the overdraft policy set for the bank account. Based on various such factors, the transaction may be authorized or denied. Assuming further that the transaction is authorized and the authorized transaction is for cash withdrawal, the ATM may dispense cash according to the authorized transaction, and the transaction may be completed.

The customer may swipe or insert the credit or debit card into a card reader of the ATM to authenticate and initiate the transaction. However, problems may occur while the customer is at the ATM, and the transaction is in progress. It may happen that the card reader stops functioning, and the inserted or swiped credit or debit card may not be read successfully. There may not be enough cash inside the ATM. A cash or check deposit bin may be full and cannot perform a transaction associated with cash or check deposit. In some cases, a display of the ATM may be broken. While these may be few examples, showing what may cause a problem at the ATM that require the ATM to put in out-of-service mode. An out-of-service ATM may cause substantial inconvenience to the bank customers and bank tellers.

DETAILED DESCRIPTION

Embodiments disclosed herein include a system that, upon determining that an ATM where a transaction being performed is unable to complete the transaction, completes a transaction at another ATM. Thus, the transaction may be transferred to the other ATM to complete without requiring a customer to execute all steps required for the transaction again at the other ATM. In this way, the system may more resilient and fault-tolerant.

As described above, various types of errors can occur at the ATM. When an error occurs at the ATM, a message describing the detected error may be sent to an application server.

An application server may be a backend server and may be communicatively coupled with the one or more ATMs using a client-server protocol. The application server and the one or more ATMs may communicate with each other using application programming interface (API) messages over a secure network. Messaging between the application server and the one or more ATMs may use any protocol such as TCP, UDP, HTTP, HTTPS, etc. The API messages may be using web service messaging such as SOAP, and/or REST.

The application server may receive notifications of the status of one or more ATMs and may also receive status of a current transaction being performed at the one or more ATMs. Based on an analysis of the error condition and the current status of the transaction, the application server may determine that the transaction may be completed at another ATM at the same location. Upon determination by the application server that the transaction may be completed at the other ATM, the application server may send a notification to the bank customer. The notification to the bank customer may indicate that the transaction may not be completed at the ATM and that the transaction may be completed at the other ATM. The bank customer may be asked to choose an option whether he or she would like to complete the transaction at the other ATM or would like to abort the transaction. The notification may indicate to the bank customer that the transaction cannot be completed at the ATM but may be completed at the other ATM and the bank customer may go to the other ATM to complete the transaction.

The application server may store information of the current transaction and/or a current session to transfer to the other ATM. Therefore, if the bank customer approaches the other ATM and provides information identifying the bank account at the other ATM, the application server may transfer stored information of the transaction and/or the session from the previous ATM to the other ATM.

When the bank customer visits the other ATM, the bank customer may authenticate using a mobile phone or the credit or debit card and PIN at the other ATM. The application server may send a machine-readable image to the mobile phone associated with the bank account for the corresponding bank transaction that could not be completed at the previous ATM. The bank customer may display the machine-readable image before the camera of the other ATM, and the other ATM may scan the machine-readable image and send the scanned machine-readable image or information extracted from the scanned machine-readable image to the application server. The application server may identify session information of the transaction being performed at the ATM, based on the received scanned machine-readable image or information extracted from the scanned machine-readable image, and the application server may then transfer the identified session information to the other ATM to complete the transaction. The other ATM may then continue a process flow from where the transaction was interrupted at the previous ATM. Accordingly, the bank customer is not required to go through all the steps to complete the transaction at the other ATM again.

To authenticate the bank customer at the other ATM, the application server may send an alphanumeric code to the mobile phone associated with the bank account for the corresponding bank transaction. The bank customer may enter the alphanumeric code at the other ATM. Based on the alphanumeric code entered at the other ATM, the application server may identify session information of the transaction being performed at the ATM. The application server may then transfer the identified session information to the other ATM to complete the transaction. The other ATM then may then continue a process flow from where the transaction was interrupted at the ATM. Accordingly, the bank customer is not required to go through all the steps to complete the transaction at the other ATM again.

The application server may store information of the transaction for a configurable period of time. The machine-readable image and/or the alphanumeric code sent to the mobile phone associated with the bank account for the corresponding bank transaction may be valid for a configurable period of time. Accordingly, if the bank customer authenticates at the other ATM within a configurable period of time, the bank customer may complete the transaction that could not be completed at the ATM.

While the example embodiments in this disclosure refer to the ATM, the disclosure applies to other types of kiosks other than ATMs as well.

Figure 1:
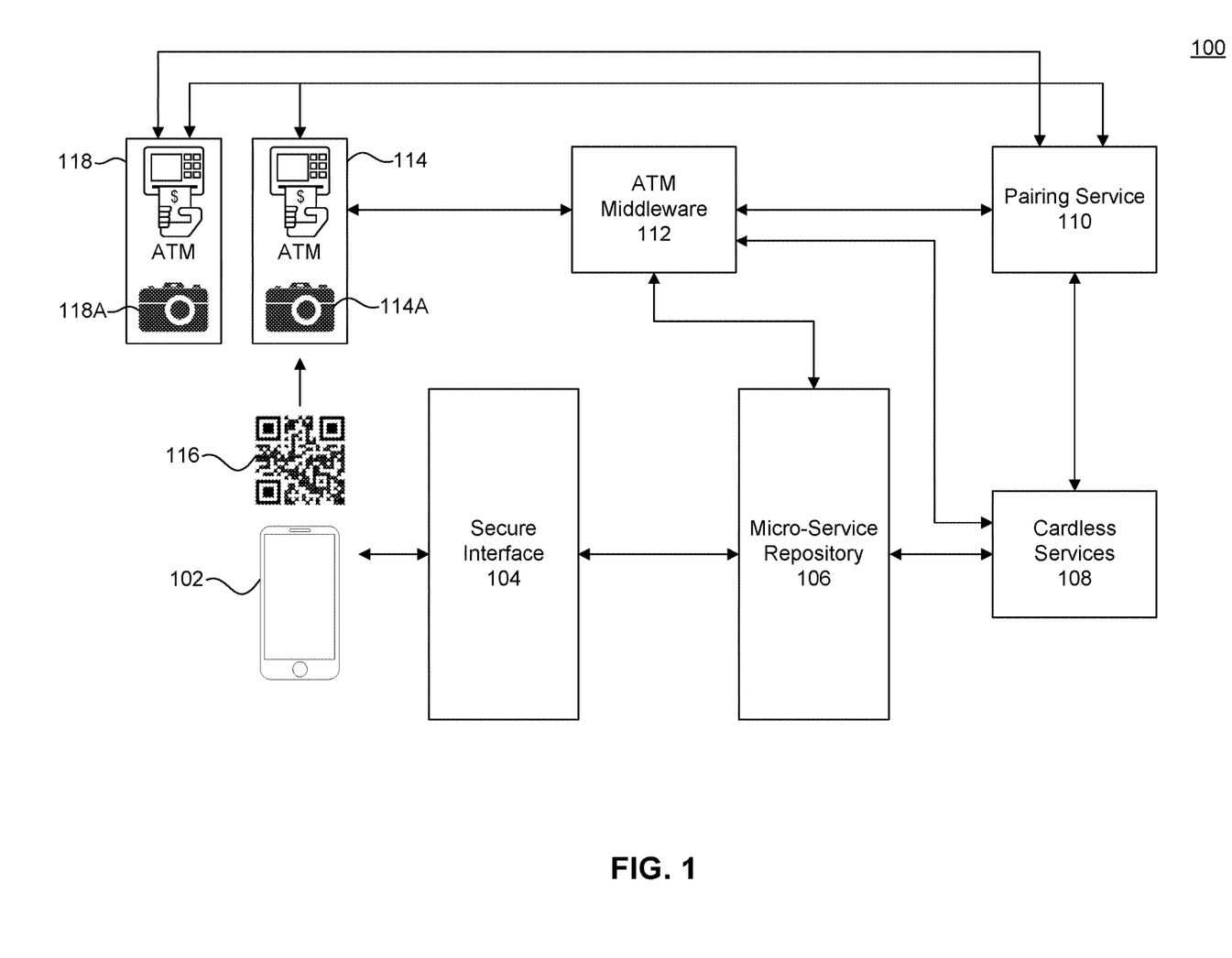
FIG. 1 illustrates an exemplary network diagram with an ATM front and back end, according to some embodiments.

FIG. 1 illustrates a block diagram of an example environment 100 in which systems and/or methods described herein may be implemented. In some embodiments, the environment 100 may include a mobile device 102 or a user equipment (UE) device 102. The user equipment device 102 may be a mobile phone, a smartphone, a tablet, a laptop, or any other computing device of the customer. The customer may download a mobile application on the UE device 102. The mobile application on the UE device 102 may allow the customer to interact with his or her bank account. For example, the customer may deposit a check to his or her account, transfer money between accounts at the bank, transfer money to an account at another bank, etc. The customer may receive a notification message at the mobile application.

In some embodiments, the example environment 100 may include ATMs 114 and 118. The ATMs 114 and 118 each may include a keyboard, a card reader, a display, a slot to dispense cash, and a slot to receive cash, a check, or an envelope. The ATMs 114 and 118 each may also include a camera, a fingerprint pad, and/or another appropriate system to collect biometric or other information from the customer for various purposes, including, for example, authentication of the user, etc.

In some embodiments, the ATMs 114 and 118 each may include a display screen, a slot to dispense cash, and a slot to receive cash, a check, or an envelope. The ATMs 114 and 118 each may include a camera, a fingerprint pad, and/or another appropriate system to collect biometric or other information from the customer. The ATMs 114 and 118 each may include one or more physical buttons for the customer to request for help. The ATMs 114 and 118 each may also display one or more clickable buttons displayed on the display screen of the ATMs 114 and 118.

In some embodiments, the ATMs 114 and 118 each may be communicatively coupled with a pairing service 110, a cardless services 108, and a micro-service repository 106 via an ATM middleware 112. The ATM middleware 112 may be similar to a secure interface 104, which is described below, and enables secure communication with the ATMs 114 and 118 from the pairing service 110, the cardless services 108, and/or the micro-service repository 106. The pairing service 110 may communicate via the ATM middleware 112 to send (periodically) the ATM identifier to the ATMs 114 and 118. The ATM identifier uniquely identifies an ATM, its geographical location, and network identification information. The network identification information may allow sending commands to a specific ATM among a plurality of ATMs.

In some embodiments, the UE device 102 may communicate with the micro-service repository 106 over a secure interface 104. The secure interface 104 may be a firewall or a virtual private network. The secure interface 104 may be a secure session layer on the UE device 102 and the micro-service repository 106 for secure communication. By way of non-limiting example, the mobile application on the UE device 102 may interact with a bank account by sending and receiving messages with the micro-service repository and cardless services 108 over the secure interface 104.

In some embodiments, the micro-service repository 106 may be an application, which receives messages from the UE device 102 for further processing. The micro-service repository 106 may implement business logic for various features and/or functionality. The micro-service repository 106 may be an application program interface (API) that processes messages received from the ATMs 114 and 118, and the UE device 102. The micro-service repository 106 may also send messages to the ATMs 114 and 118, and the UE device 102 based on the processed received messages. The micro-service repository 106 may be installed on one or more servers, which may be a server described below with reference to FIG. 3.

In some embodiments, the micro-service repository 106 may send the received messages after initial processing to cardless services 108. The cardless services 108 may further process the received messages. The cardless services 108 may have access to one or more databases, which may include a record(s) of an account(s) of the customer(s).

In one example, when the bank customer initiates a transaction at the ATM 114, the customer may swipe or insert his or her credit or debit card into a card reader of the ATM 114. The customer may be asked to enter his or her PIN. The ATM 114 may communicate with the micro-service repository 106 over the ATM middleware 112 for authentication of the customer. The received message(s) at the micro-service repository 106 from the ATM 114 may include, for example, an account number and a PIN. The received message(s) from the ATM 114 may also include an ATM identifier, which identifies the ATM, its physical or geographical location, and/or its network identification information.

The micro-service repository 106 and/or the cardless services 108 may authenticate the transaction request received from the ATM 114. The micro-service repository 106 and/or the cardless services 108 may verify that the PIN entered by the customer at the ATM 114 matches with the account associated with the credit or debit card. The micro-service repository 106 and/or the cardless services 108 may verify that the customer has not exceeded his or her daily limits of a number of transactions or withdrawal as set by the bank and/or the customer. The micro-service repository 106 and/or the cardless services 108 may also verify that the requested withdrawal of the amount is valid according to an overdraft policy set for the account. The micro-service repository 106 and/or the cardless services 108 may then authorize or deny the transaction to withdraw money at the ATM 114 and may send instructions of command indicating authorization or denial of the transaction. The ATM 114 may continue based on the received instructions from the micro-service repository and/or the cardless services 108.

In some embodiments, the pairing service 110 may generate a machine-readable image 116 and send the machine-readable image 116 to the mobile device 102 via the micro-service repository 106 and/or the cardless services 108. The machine-readable image 116 may be a barcode. The barcode may be a quick response (QR) code. The barcode displayed on the display of the UE device 102 may be one-dimensional (1D) or two-dimensional (2D). The 2D barcodes may include rectangle, dots, hexagons, or any other geometric pattern. The machine-readable image 116 may include information identifying a transaction, a bank account, and/or an ATM, etc. The pairing service 110 may generate a unique machine-readable image for each transaction. The machine-readable image generated by the pairing service may be valid for a configurable time period. Accordingly, the pairing service may regenerate another machine-readable image for the same transaction.

The pairing service 110 may communicate with the ATMs 114 and 118 over a secure or an unsecured communication network and send an ATM identifier, which is unique for each of the ATMs 114 and 118. The communication between the pairing service 110 and the ATM 114 may be using an application program interface (API) message(s). The pairing service 110 may be a process on one or more computing devices. The pairing service may be implemented as software, hardware, and/or a module(s).

In some embodiments, the UE device 102 may communicate with a micro-service repository 106 over a secure interface 104. The secure interface 104 may be a firewall or a virtual private network. The secure interface 104 may be a secure session layer on the UE devices 102 and the micro-service repository 106 for secure communication.

In some embodiments, the micro-service repository 106 may be an application, which receives messages from the UE device 102 for further processing. The micro-service repository 106 may implement business logic for various features and/or functionality. The micro-service repository 106 may be an application program interface (API) that processes messages received from the UE device 102. The micro-service repository 106 may also send messages to the UE device 102 based on the processed received messages. The micro-service repository 106 may be installed on one or more servers, which may be a server described below with reference to FIG. 3.

In some embodiments, the micro-service repository 106 may send the received messages after initial processing to cardless services 108. The cardless services 108 may further process the received messages. The cardless services 108 may have access to one or more databases, which may include a record(s) of an account(s) of the customer(s).

In some embodiments, the ATMs 114 and 118 each may be communicatively coupled with the pairing service 110, the cardless services 108, and the micro-service repository 106 via an ATM middleware 112. The ATM middleware 112, similar to the secure interface 104, enables secure communication with the ATM 114 from the pairing service 110, the cardless services 108, and/or the micro-service repository 106. The pairing service 110 may transmit ATM identifier for each of the ATMs 114 and 1118 over a separate path or via the ATM middleware 112.

In some embodiments, when the customer reaches the ATM 114, the customer may start the transaction at the ATM 114 by swiping or inserting his or her bank-issued credit or debit card and entering his or her PIN. The ATM 114 may send the information read from the credit or debit card and PIN to the micro-service repository 106 and/or the cardless services 108 for authentication of the customer. The micro-service repository 106 and/or the cardless services 108 may verify the information received from the ATM 114 and authenticate the customer. Upon successful authentication, the micro-service repository 106 and/or the cardless services 108 may send command(s) or instruction(s) indicating authentication result to the ATM 114.

Assuming, for example, that the credit or debit card is valid and the PIN is correct, the customer is successfully authenticated. Accordingly, based on the received command(s) or instruction(s) indicating successful authentication, ATM 114 may present to the customer options to select a transaction type. The transaction type may be a withdrawal of cash, a deposit of cash, balance inquiry, etc. For example, the customer selects withdrawal of cash; the ATM 114 may then present to the customer options to select an account, for example, a savings and/or checking account, from which the cash may be withdrawn. After the customer selects the account to withdraw cash, the ATM 114 may present to the customer options to select an amount to withdraw, such as $20, $40, $60, $80, $100, $200, and/or another amount. The customer, for example, selects other amount and requests $50 to withdraw from the account. The ATM 114 may then detect that there are no bills of five dollars, ten dollars, or one dollar. The ATM 114, therefore, cannot dispense to the customer requested $50. The ATM 114 may send a message including one or more error codes to the micro-service repository 106 and/or the cardless services 108. The one or more error codes may be based on detected error conditions preventing normal operations of the ATM. The message from the ATM 114 may also include information about the current transaction. The information of the current transaction may include information read from the credit or debit card, PIN, transaction type, transaction amount, account information, and/or ATM identifier, etc. The micro-service repository 106 and/or the cardless service 108 may analyze the error code and status of the current transaction in the message received from the ATM 114. The micro-service repository 106 and/or the cardless services 108 may determine one or more options available to complete the transaction based on the error code and the status of the current transaction. For example, if the error code indicates that there are no bills of five dollars, ten dollars, or one dollar, and the customer has requested fifty dollars, the micro-service repository 106 and/or the cardless services 108 may determine the location of the ATM based on the ATM identifier. Based on the location determined of the ATM, the micro-service repository 106 and/or the cardless services 108 may determine if there is another ATM at the same location. Upon determination that there is another ATM, e.g., ATM 118, at the same location, the micro-service repository 106 and/or the cardless services 108 may send a command or instruction to the ATM 118 to confirm that ATM 118 can dispense fifty dollars to the customer. Upon receiving a message from the ATM 118 at the micro-service repository 106 and/or the cardless service 108, the micro-service repository 106 and/or the cardless service 108 may determine that the transaction requested by the customer may be completed at the ATM 118.

If based on the received message from the ATM 118, the micro-service repository 106 and/or the cardless service 108 determines that the ATM 118 also cannot dispense requested fifty dollars to the customer, the micro-service repository 106 and/or the cardless service 108 may determine that a second option to complete the transaction is requesting the customer to withdraw an amount in multiples of twenty. Thus, based on the analysis of the error code(s) and the status of the current transaction at the ATM 114, the micro-service repository 106 and/or the cardless service 108 may determine an option to complete the transaction.

The micro-service repository 106 and/or the cardless service 108 may then send a notification message to the UE device 102, which is associated with the account of the current transaction. The notification may indicate to the customer that the transaction may be completed at the other ATM, the ATM 118. The notification sent to the UE device 102 may also be sent to the ATM 114 to display on the display screen the ATM 114.

The micro-service repository 106 and/or the cardless service 108 may then communicate with the pairing service 110 to generate a unique machine-readable image associated with the current transaction, and transmit the generated unique machine-readable image to the UE device 102. The transaction may be completed at the ATM 118 within the configurable period, for example, ten minutes. Therefore, the customer may go to the ATM 118, or any other ATM, within ten minutes to complete the transaction without repeating all the steps of the transaction. Accordingly, the pairing service 110 may generate a new unique machine-readable image associated with the transaction at the ATM 114 at a configurable period, for example, every thirty seconds, to send to the UE device 102.

When the customer goes to the ATM 118, the customer may present the received unique machine-readable image 116 on the UE device 102 before a camera 118A of the ATM 118. The ATM 118 may then scan the machine-readable image 116 and send the scanned machine-readable image with an ATM identifier assigned to the ATM 118 to the micro-service repository 106 and/or the cardless services 108. Upon receiving the scanned machine-readable image that uniquely identifies the transaction at the ATM 114 and based on the status of the transaction, the micro-service repository 106 and/or the cardless services 108 may determine that the customer is now at the ATM 118 to complete the transaction. Therefore, the micro-service repository 106 and/or the cardless services 108 may then transfer a session associated with the transaction at the ATM 114 to the ATM 118. The micro-service repository 106 and/or the cardless services 108 may send instruction or command to dispense fifty dollars. Thus, the micro-service repository 106 and/or the cardless services 108 may send instruction or command to the ATM 118 to execute specific step bypassing steps performed in the routine transaction flow.

In some embodiments, instead of the machine-readable image 116, an alphanumeric code may be generated and sent to the UE device 102. Similar to the machine-readable image, the alphanumeric code also uniquely identifies the transaction at the ATM 114. The alphanumeric code may also be valid for a configurable time period and may be refreshed as specified by a configurable time period.

In some embodiments, the customer may be required to swipe or insert his or her credit or debit card at the ATM 118 and enter his or her PIN. The message sent from the ATM 118 including information read from the credit or debit card and PIN to the micro-service repository 106 and/or the cardless services 108 may be used to identify the transaction, which was not completed at the ATM 114. Accordingly, instead of the authentication result, the micro-service repository and/or the cardless services 108 may send command or instruction to complete the transaction, i.e., to dispense fifty dollars, according to the example.

Figure 2A:
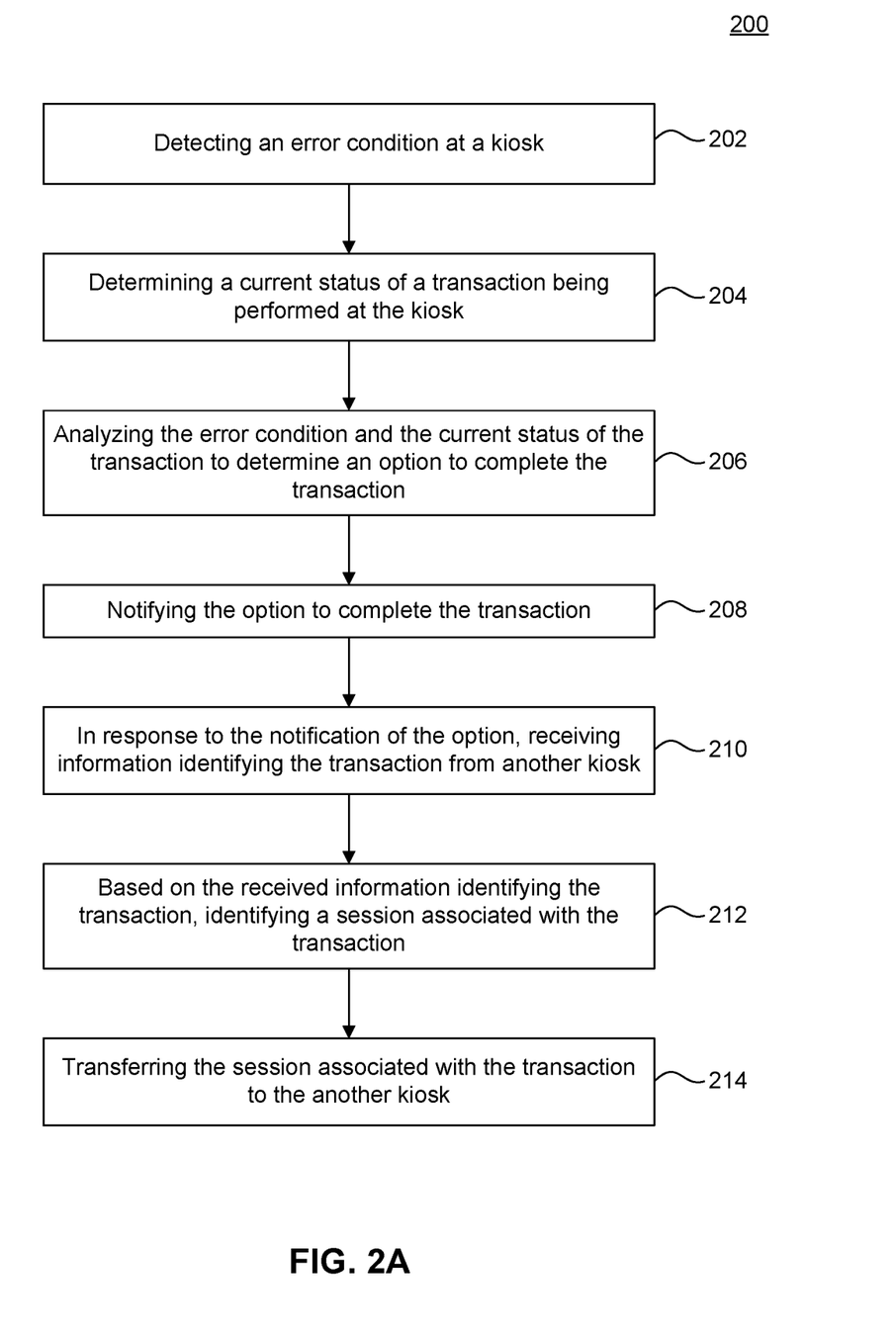
FIG. 2A is a flow-chart illustrating a method for transferring a transaction from an ATM with an error condition to another ATM, according to some embodiments.

FIG. 2A is a flow-chart illustrating a method for transferring a transaction from an ATM with an error condition to another ATM, according to some embodiments. FIG. 2A illustrates a flow-chart 200 of a process for completing the transaction at another ATM upon determining that an ATM where a transaction being performed is unable to complete the transaction according to an embodiment. The micro-service repository 106, the cardless services 108, and the pairing services 110 may be on a single server or may be distributed on different servers. Irrespective of whether the micro-service repository 106, the cardless services 108, and the pairing services 110 are on the single server or different servers, together they form a backend system. While the disclosure used ATM to describe various embodiments, the disclosure applies to a kiosk to serve a customer, for example, to deliver a ticket and/or a boarding pass, a preordered lunch, etc.

In some embodiments, at step 202, as described above, an error condition at the ATM 114 may be detected. The error condition may be detected by the backend system based on monitoring the number of transactions performed at the ATM 114. The transactions performed at the ATM 114 may be compared against a threshold value of transactions set for each transaction type over a configurable period of time. Accordingly, if the backend system determines that the number of transactions of the transaction type performed over the configurable period of time is less than the threshold value of transactions set for each transaction type, the backend system may determine that there is a problem with the ATM 114. Based on the type of transaction that failed to exceed the threshold value of transactions, the backend system may determine a type of error. By way of non-limiting example, if the number of card-based transactions expected between 10 AM to 11 AM on a weekday is twenty, and an actual number of the card-based transaction at the ATM are zero, the backend system may determine that the card reader may be broken. Similarly, if expected number of cash withdrawal transactions and cash deposit transactions between 10 AM to 11 AM on a weekday are ten each, but the backend system determines that the actual number of cash deposit transactions are zero while actual number of cash withdrawal transactions are twelve; the backend system may conclude that there may be an issue with the cash deposit bin and/or cash deposit slot.

In some embodiments, the error at the ATM 114 may be detected based on a signal received from a sensor providing health information of mechanical, electrical, and/or electro-mechanical parts of the ATM. Based on the signal received from the sensor, the ATM 114 may send a message including one or more error codes associated with the signal from the sensor to the backend system.

In some embodiments, the backend system may periodically send a command or instruction to perform a health check of various parts and operations of the ATM. For example, the backend system may periodically check available cash inside the ATM for each type of bill. The backend system may periodically check available space in the cash deposit bin and/or verify the health status of various mechanical, electrical, and/or electromechanical parts.

In some embodiments, the ATM may report an error condition as the error condition is encountered while performing the transaction at the ATM.

In some embodiments, at step 204, the current status of the transaction being performed at the ATM 114 may be determined. As described above, when the customer at the ATM 114 selects an option to withdraw fifty dollars bills, the backend system may determine the status of the transaction based on the state of the transaction. By way of non-limiting example, the status of the transaction may indicate the customer is authenticated and the transaction is authorized for cash withdrawal.

In some embodiments, at step 206, the backend system may analyze the error condition and the current status of the transaction to determine an option to complete the transaction at another ATM. As described above, if the backend system determines that a cash withdrawal transaction failed at the ATM 114 because there are no bills of one dollar, five dollars, or ten dollars in the ATM and the customer has requested fifty dollars for withdrawal, the transaction may be completed at the ATM 118, which is located at the same location, or within a threshold distance. The backend system may determine other available ATM at the location identified based on the ATM identifier received in the message from the ATM 114. The backend system may store information of ATMs in the database, where the information may include ATM identifier assigned to each ATM, a physical or geographical location of the ATM, network identification information of the ATM, etc. Accordingly, based on the location identified from the ATM identifier, the backend system may determine other ATM(s) available at the same location and/or nearby. Further, as described above, the backend system may verify that the transaction that could not be completed at the ATM 114 may be completed at the other ATM(s) at the same location and/or nearby.

In some embodiments, at step 208, the backend system may send a notification message to the UE device 102 and/or the ATM 114 to display on a display screen of the ATM 114. The notification may indicate to the user that the transaction may be completed at the other ATM, for example, the ATM 118, within a specific time period that may be configurable at the backend system.

In some embodiments, at step 210, upon receiving a notification at the UE device 102 and/or the ATM 114, the customer may go to the ATM 118 to complete the transaction. As described above, the customer may either swipe or insert his or her credit or debit card into the card reader slot and enter his or her PIN associated with the credit or debit card. The ATM 118 may then send the information read from the credit or debit card, the entered PIN, and the ATM identifier assigned to the ATM 118 to the backend system.

In some embodiments, at step 210, the customer may present a machine-readable image 116 received on the UE device 102 before the camera 118A, so that the machine-readable image 116 can be scanned and sent to the backend system. The ATM 118 may then send the scanned machine-readable image and the ATM identifier assigned to the ATM 118 to the backend system.

In some embodiments, at step 210, the customer may enter an alphanumeric code received on the UE device 102 at the ATM 118. The ATM 118 may then send the entered alphanumeric code and the ATM identifier assigned to the ATM 118 to the backend system.

In some embodiments, at step 212, upon receiving information identifying the account the backend system may identify the transaction associated with the account that was initiated at the ATM 114 and could not be completed due to an error condition at the ATM 114. The backend system may identify the transaction initiated at the ATM 114 based on the received alphanumeric code and/or the scanned machine-readable image from the ATM 118. Accordingly, the backend system may identify a session and associated session information with the transaction. The session information may comprise transaction type, transaction amount, bank account, ATM identifier of the ATM where the transaction was initiated, date and time of the transaction, transaction expiration date and time, etc.

In some embodiments, at step 214, upon identifying the session associated with the transaction, and determining that the transaction has not yet expired, the backend system may transfer the session associated with the transaction initiated at the ATM 114 to the ATM 118. The backend system may send command(s) or instruction(s) to the ATM 118 based on the state of the transaction. As described above, the next expected event in state indicating the customer is authenticated and the transaction is authorized for cash withdrawal is to dispense money; the backend system may send command(s) or instruction(s) to the ATM 118 to dispense cash according to the authorized cash withdrawal request. Therefore, the customer is not required to repeat the steps that are generally required to withdraw some money at the ATM 118.

Figure 2B:
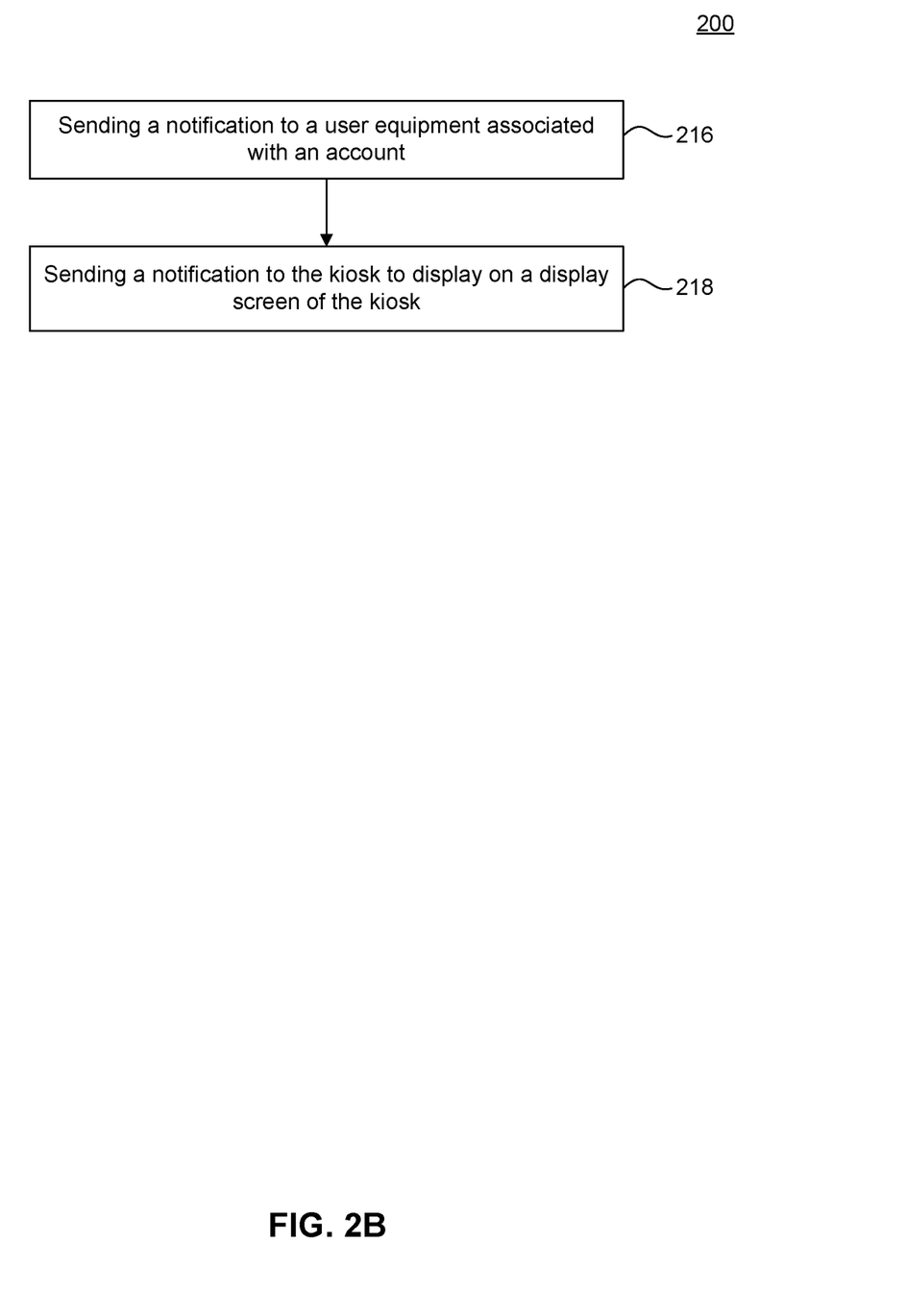
FIG. 2B is a flow-chart illustrating a method for notifying a user to transfer a transfer a transaction from the ATM with an error condition to the other ATM, according to some embodiments.

FIG. 2B is a flow-chart illustrating a method for notifying a user to transfer a transfer a transaction from the ATM with an error condition to the other ATM, according to some embodiments. FIG. 2B illustrates a flow-chart 200 of a process for sending a notification to the customer upon error detection at the ATM 114, and upon determining that the transaction initiated at the ATM 114 may be completed at the ATM 118. In some embodiments, at step 216, the backend system may send a notification to the UE device 102 as described above. The notification may indicate that the transaction cannot be completed at the ATM 114. However, the transaction may be completed at the ATM 118 or other ATMs. The notification may also indicate a date and time before which the customer may complete the transaction at the ATM 118 or other ATMs.

In some embodiments, at step 218, the backend system may send a notification to the ATM 114 to display on the screen of the ATM 114. The notification sent to the ATM 114 may indicate that the transaction cannot be completed at the ATM 114. However, the transaction may be completed at the ATM 118 or other ATMs. The notification may also indicate a date and time before which the customer may complete the transaction at the ATM 118 or other ATMs. Further, it is not required that the notification be sent to both the UE device 102 and the ATM 114.

Figure 2C:
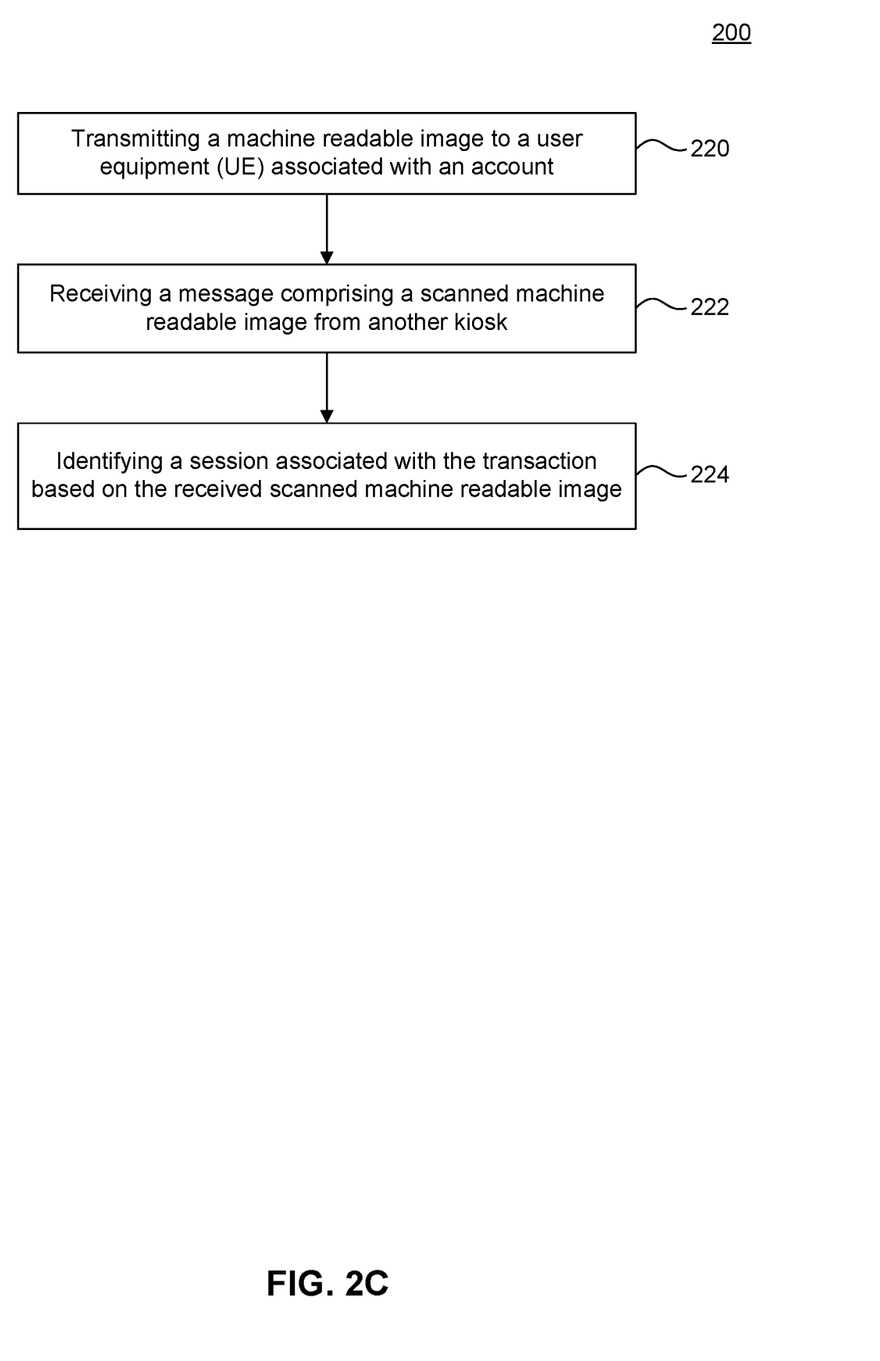
FIG. 2C is a flow-chart illustrating a method for identifying a session associated with the transaction, according to some embodiments.

FIG. 2C is a flow-chart illustrating a method for identifying a session associated with the transaction, according to some embodiments. FIG. 2C illustrates a flow-chart 200 of a process for identifying a transaction that was initiated at the ATM 114. In some embodiments, at step 220, the backend system may send a machine-readable image 116 to the UE device 102 upon determining that the transaction that was initiated at the ATM 114 may be completed at the ATM 118 as described above. The machine-readable image 116 may be a bar code, a QR code, or any image that may be associated with the transaction initiated at the ATM 114. In some embodiments, instead of the machine-readable image, an alphanumeric code may also be sent to the UE device 102, as described above.

In some embodiments, at step 222, the customer may go to the ATM 118 before the date and time indicated in the notification as described above and may present the machine-readable image 116 received on the UE device before the camera 118A. The ATM 118 may scan the machine-readable image and send the scanned machine-readable image to the backend system along with the ATM identifier assigned to the ATM 118 to the backend system.

In some embodiments, at step 222, the customer may go to the ATM 118 before the date and time indicated in the notification as described above and may enter the received alphanumeric code at the UE device at the ATM 118. The ATM 118 may send the entered alphanumeric code and the ATM identifier assigned to the ATM 118 to the backend system.

In some embodiments, at step 222, the customer may go to the ATM 118 before the date and time indicated in the notification as described above, and may swipe or insert his or her credit or debit card and enter a PIN associated with the credit or debit card. The ATM 118, as described above, may send the information read from the credit or debit card, PIN, and the ATM identifier assigned to the ATM 118 to the backend system.

In some embodiments, at step 224, based on the received scanned machine-readable image, the alphanumeric code or the account information identified based on the credit or debit card and PIN, the backend system may identify a session associated with the transaction that was initiated at the ATM 114 and could not be completed due to the error condition. The machine-readable image and/or the alphanumeric code uniquely identifies the transaction, and, therefore, may be used to determine the session associated with the transaction. Further, the account information may also be used to determine the session associated with the transaction as the backend system updates account with the current transaction state.

The following example may be used to describe the above method for transferring a transaction from an ATM with an error condition to another ATM. A bank customer Nice Guy visits an ATM to withdraw fifty dollars from his checking account at A Best Bank. There are two ATMs, ATM-1 and ATM-2, outside A Best Bank. The bank customer Nice Guy goes to ATM-1 and inserts his debit card issued by A Best Bank. Nice Guy then enters a PIN to authenticate himself After Nice Guy has been authenticated, he selects withdrawal option from various options and next selects he wants to withdraw from his checking account. Next, Nice Guy enters fifty dollars to withdraw. ATM-1 detects that there are only twenty dollars bills and no bills of one dollar, five dollars, and/or ten dollars. ATM-1 then generates a message to the application server. The message generated by ATM-1 may include one or more error codes corresponding to no bills of one dollar, five dollars, and/or ten dollars. The message from ATM-1 may also include information of the current transaction, i.e., information decoded from the debit card, PIN, transaction type, transaction amount, bank account, etc. The application server may determine that ATM-2 could dispense fifty dollars to Nice Guy. The application server may send a notification message to a mobile phone of Nice Guy that is associated with the bank account associated with the current transaction. The application server may also transmit a notification message to display on a display screen of the ATM-1. The notification message to the mobile phone and/or the ATM-1 may indicate to Nice Guy that the transaction may be completed at ATM-2. Accordingly, when Nice Guy goes to ATM-2 and swipes or insert his or her card at ATM-2 and enters the PIN, the application server may transfer saved session information of the transaction being performed at ATM-1 to ATM-2. Therefore, ATM-2 may skip steps to display various transactions that can be performed at ATM-2, to select withdrawal, to select an account to withdraw from and to select the amount to withdraw. Instead, ATM-2 may immediately dispense fifty dollars to Nice Guy, just like, ATM-1 would have dispensed if ATM-1 had ten dollars bills. Accordingly, Nice Guy is not required to go through all the steps required for withdrawal of money from his account and saves the time of Nice Guy.

Figure 3:
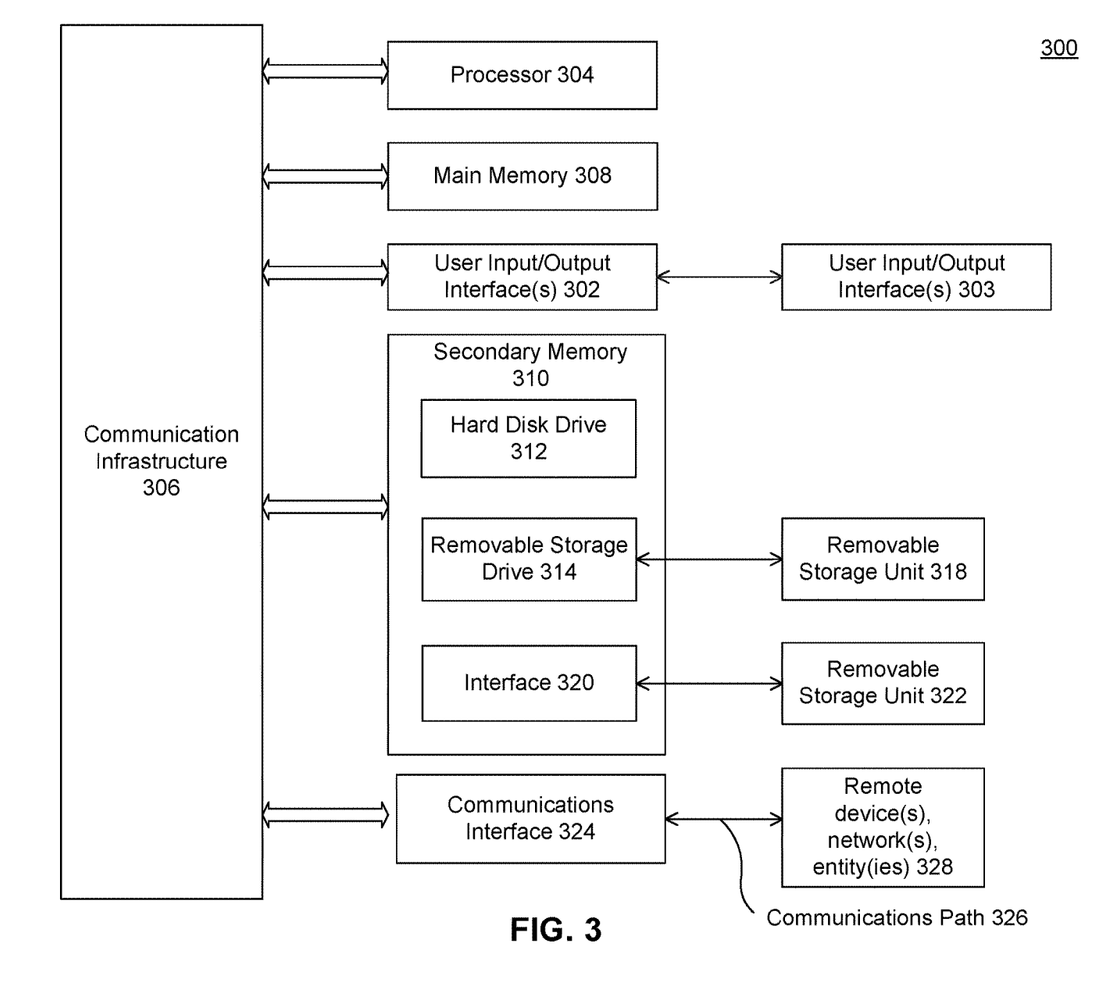
FIG. 3 illustrates an exemplary computer system, according to some embodiments.

FIG. 3 illustrates an exemplary computer system, in accordance with some embodiments.

Various embodiments may be implemented, for example, using one or more well-known computer systems, such as a computer system 300, as shown in FIG. 3. One or more computer systems 300 may be used, for example, to implement any of the embodiments discussed herein, as well as combinations and sub-combinations thereof. The computer systems 300 may be used for the micro-service repository 106, the pairing service 110, and/or the cardless services 108, described above.

The computer system 300 may include one or more processors (also called central processing units, or CPUs), such as a processor 304. The processor 304 may be connected to a communication infrastructure or bus 306.

The computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 300 may also include a main or primary memory 308, such as random access memory (RAM). Main memory 308 may include one or more levels of cache. Main memory 308 may have stored therein control logic (i.e., computer software) and/or data.

The computer system 300 may also include one or more secondary storage devices or memory 310. The secondary memory 310 may include, for example, a hard disk drive 312 and/or a removable storage device or drive 314. The removable storage drive 314 may be a floppy disk drive, a magnetic tape drive, a compact disk drive, an optical storage device, tape backup device, and/or any other storage device or storage drive.

The removable storage drive 314 may interact with a removable storage unit 318. The removable storage unit 318 may include a computer usable or readable storage device having stored thereon computer software (control logic) and/or data. The removable storage unit 318 may be a floppy disk, magnetic tape, compact disk, DVD, optical storage disk, and/any other computer data storage device. The removable storage drive 314 may read from and/or write to the removable storage unit 318.

The secondary memory 310 may include other means, devices, components, instrumentalities or other approaches for allowing computer programs and/or other instructions and/or data to be accessed by the computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 300 may further include a communication or network interface 324. The communication interface 324 may enable the computer system 300 to communicate and interact with any combination of external devices, external networks, external entities, etc. (individually and collectively referenced by reference number 328). For example, the communication interface 324 may allow the computer system 300 to communicate with the external or remote devices 328 over communications path 326, which may be wired and/or wireless (or a combination thereof), and which may include any combination of LANs, WANs, the Internet, etc. Control logic and/or data may be transmitted to and from the computer system 300 via the communication path 326.

The computer system 300 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 300, the main memory 308, the secondary memory 310, and the removable storage units 318 and 322, as well as tangible articles of manufacture embodying any combination of the foregoing. Such control logic, when executed by one or more data processing devices (such as the computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

The claims in the instant application are different than those of the parent application or other related applications. The Applicant, therefore, rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method of operating a kiosk, comprising:
   detecting, by one or more computing devices, an error condition at the kiosk;
   determining, by the one or more computing devices, a current status of a transaction being performed at the kiosk;
   analyzing, by the one or more computing devices, the error condition and the current status of the transaction to determine an option to complete the transaction;
   providing, by the one or more computing devices, a notification of the option to complete the transaction, wherein the notification is sent as a message to a user equipment (UE) associated with an account that is associated with the transaction;
   in response to the notification of the option, receiving, by the one or more computing devices, information identifying the transaction from another kiosk;

based on the received information identifying the transaction, identifying, by the one or more computing devices, a session associated with the transaction; and
transferring, by the one or more computing devices, the session associated with the transaction to the other kiosk,
thereby allowing the transaction to complete at the other kiosk.

2. The method of claim 1, wherein the detecting the error condition at the kiosk comprises comparing, by the one or more computing devices, a number of transactions of a type of transaction over a configurable duration against a configurable threshold count of transactions set for the type of transaction over the configurable duration.

3. The method of claim 1, wherein the detecting the error condition at the kiosk comprises receiving, by the one or more computing devices, a message indicating status of a part of the kiosk as detected by a sensor at the kiosk.

4. The method of claim 1, further comprising sending the notification as another message to the kiosk to display on a display screen of the kiosk.

5. The method of claim 1, further comprising:
sending, by the one or more computing devices, a machine-readable image to the UE, and wherein the machine-readable image comprises the information identifying the transaction.

6. The method of claim 5, wherein the information identifying the transaction is obtained by the other kiosk from the machine-readable image.

7. The method of claim 5, wherein receiving the information identifying the transaction comprises:
receiving, by the one or more computing devices, a message from the other kiosk, wherein the message from the other kiosk comprises a scanned copy of the machine-readable image as displayed on the UE and scanned by a camera on the other kiosk.

8. The method of claim 1, wherein transferring the session associated with the transaction to the other kiosk comprises sending, by the one or more computing devices, a command to the other kiosk based on the current status of the transaction.

9. A system, comprising:
a memory for storing instructions; and
one or more processors, communicatively coupled to the memory, configured to execute the instructions, the instructions causing the one or more processors to:
detect an error condition at a kiosk;
determine a current status of a transaction being performed at the kiosk;
analyze the error condition and the current status of the transaction to determine an option to complete the transaction;
provide a notification of the option to complete the transaction, wherein the notification is sent as a message to a user equipment (UE) associated with an account that is associated with the transaction;
in response to the notification of the option, receive information identifying the transaction from another kiosk;
based on the received information identifying the transaction, identify a session associated with the transaction; and
transfer the session associated with the transaction to the other kiosk to allow the transaction to complete at the other kiosk.

10. The system of claim 9, wherein the one or more processors are further configured to send the notification as another message to the kiosk to display on a display screen of the kiosk.

11. The system of claim 9, wherein the one or more processors are further configured to:
send a machine-readable image to the UE, and wherein the machine-readable image comprises the information identifying the transaction.

12. The system of claim 11, wherein the information identifying the transaction is obtained by the other kiosk from the machine-readable image.

13. The system of claim 9, wherein to receive the information identifying the transaction, the one or more processors are further configured to:
receive a message from the other kiosk, wherein the message from the other kiosk comprises a scanned copy of the machine-readable image as displayed on the UE and scanned by a camera on the other kiosk.

14. The system of claim 9, wherein to transfer the session associated with the transaction to the other kiosk, the one or more processors are further configured to send a command to the other kiosk based on the current status of the transaction.

15. A non-transitory, tangible computer-readable device having instructions stored thereon that, when executed by at least one computing device, causes the at least one computing device to perform operations comprising:
detecting an error condition at a kiosk;
determining a current status of a transaction being performed at the kiosk;
analyzing the error condition and the current status of the transaction to determine an option to complete the transaction;
providing a notification of the option to complete the transaction, wherein the notification is sent as a message to a user equipment (UE) associated with an account that is associated with the transaction;
in response to the notification of the option, receiving information identifying the transaction from another kiosk;
based on the received information identifying the transaction, identifying a session associated with the transaction; and
transferring the session associated with the current status of the transaction to the other kiosk,
thereby allowing the transaction to complete at the other kiosk.

16. The non-transitory, tangible, computer-readable device of claim 15, wherein the operations further comprise:
sending a machine-readable image to the UE, and wherein the machine-readable image comprises the information identifying the transaction.

17. The non-transitory, tangible, computer-readable device of claim 16, wherein for receiving the information identifying the transaction, the operations further comprise:
receiving a message from the other kiosk, wherein the message from the other kiosk comprises a scanned machine-readable image as displayed on the UE and scanned by a camera on the other kiosk.

* * * * *